Oct. 19, 1965     A. J. WILLIAMS     3,212,522

SERIES TYPE VALVES WITH FLOAT POSITION

Filed Oct. 11, 1963

INVENTOR
ARTHUR J. WILLIAMS

United States Patent Office 3,212,522
Patented Oct. 19, 1965

3,212,522
SERIES TYPE VALVES WITH FLOAT POSITION
Arthur J. Williams, Hubbard, Ohio, assignor to Commercial Shearing & Stamping Company, a corporation of Ohio
Filed Oct. 11, 1963, Ser. No. 315,560
5 Claims. (Cl. 137—596.12)

This invention relates to a series type valve with float position and particularly to a series type valve adapted for use in assemblies of parallel valves while permitting conjoint use of any such valves. Prior to the present invention series valves have been available, however such valves could not precede another valve such as a parallel type valve because operation of the series valve prevented use of any other valve following. This was a serious disadvantage, requiring the placement of any series valve as the last valve in any assembly of valves. I know of no series float valve in the prior art capable of being placed in an assembly of valves such parallel valves of the A-20 and A-35 type sold by Commercial Shearing and Stamping Company of Youngstown, Ohio.

I have invented a series type valve having a float position and capable of being used at any point in any assembly of other valves while permitting the simultaneous use of such other valves. The float position permits the two sides of a double acting cylinder to be connected together to prevent cavitation on the lowering part of a cylinder cycle.

In a preferred embodiment I provide a housing having a bore extending therethrough and open at each end to receive an elongated spool valve element, a fluid inlet in said housing extending transverse to said bore and intersecting the bore intermediate its ends, a fluid outlet in said housing on each side of the fluid inlet, each extending transversely of said bore and intersecting the bore at a point adjacent to but spaced from the intersection of the inlet passage, a valve element slidable in said bore, said valve element being hollow along its axis from a point adjacent one end to a point adjacent the opposite end, a pair of high pressure outlets intersecting the bore one on either side of the said fluid inlet and outlets, a pair of exhaust outlets in the housing intersecting the bore on either side of the fluid inlet and outlets and passage means communicating between the fluid inlet and the bore adjacent each of the high pressure outlets, said valve element having a neutral position in which fluid passes directly through the fluid inlet and the bore into the fluid outlets, a power position for each high pressure outlet which directs fluid from the fluid inlet through the said passage means to one high pressure outlet while directing fluid from the other high pressure outlet to an adjacent outlet and a float position in which the two high pressure outlets are connected through the hollow axis of the valve element, said valve element having a bleeder means communicating between an exhaust outlet and said hollow axis and high pressure outlets permitting excess fluid in the system to be exhausted during the float position. Preferably, the passage means is bifurcated and provided with check valve means preventing fluid from returning to the fluid inlet from the high pressure outlets by way of the passage means.

In the foregoing general description I have set out certain objects, advantages and purposes of my invention. Other objects, advantages and purposes will be apparent from a consideration of the following description and the accompanying drawings in which, FIGURE 1 is a vertical section through a preferred embodiment of valve according to my invention with the valve element in neutral position;

Figure 1:
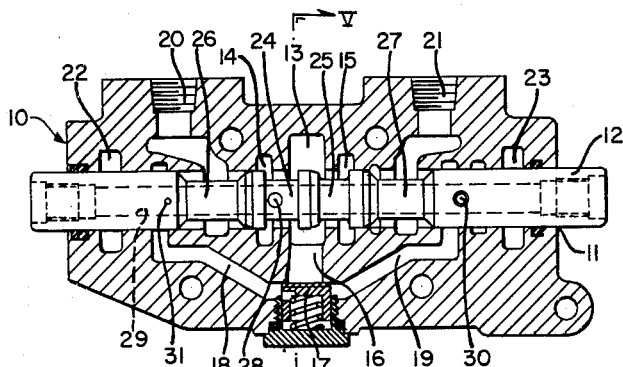

Referring to the drawings I shall describe the structure and operation of the valve of my invention in connection with its use on a lift cylinder such as is used on the bucket of a highlift.

In FIGURE 1, I have shown a housing or body 10, having a bore 11 carrying a valve element or spool 12 slidable therein. A high pressure inlet 13 intersects the bore 11 intermediate its ends and communicates to the exterior of the housing. Spaced fluid outlets 14 and 15 intersect the bore 11 spaced from and on opposite sides of high pressure inlet 13. The fluid outlets 14 and 15 communicate to the exterior of the housing opposite the inlet bore through a single elongated port 50. A passage 16 connects the high pressure inlet 13 with the bore 11 through check valve 17 to bifurcated arms 18 and 19. High pressure outlets or ports 20 and 21 intersect the bore 11 between the arms 18 and 19 and fluid outlets 14 and 15. Exhaust outlets 22 and 23 extend through the housing parallel to high pressure inlet 13 and fluid outlets 14 and 15 and intersect bore 11 adjacent its two ends. The exhaust outlets 22 and 23 serve to protect the seals at the end of bore 11 against high pressure fluid and connect the exhaust passages of preceding and following parallel type valves (not shown).

In the neutral position shown in FIGURE 1 fluid enters high pressure inlet 13 from a next preceding valve or inlet section (not shown) and passes through grooves 24 and 25 in the valve through bore 11 into fluid outlets 14 and 15 which discharge to the next valve. Simultaneously, fluid enters passage 16 and arms 18 and 19 through check valve 17 to pressurize passage 16 and arms 18 and 19 and through opening 28 into passage 29 which extends axially within the valve element or spool 12 to pressurize the interior of the spool.

Figure 2:
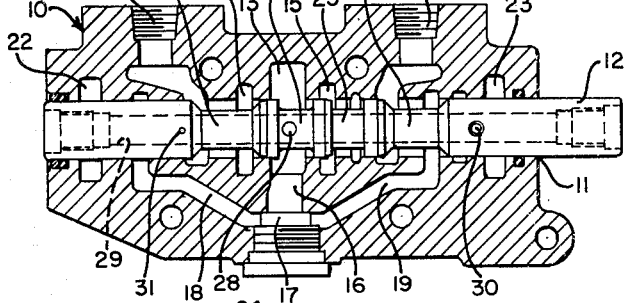
FIGURE 2 is a section identical with that of FIGURE 1 with the valve element in one power position as, for example, to raise a highlift bucket.

In the raise position shown in FIGURE 2, fluid again enters fluid inlet 13 but is blocked from entering fluid outlets 14 and 15 by the lands on opposite sides of groove 24. Fluid from inlet 13 passes through passage 16, check valve 17 and arm 19 to the bore 11 where it passes through groove 27 in spool 12 to high pressure outlet or port 21 and to the working cylinder (not shown). Fluid from the opposite side of the work cylinder returns through high pressure outlet or port 20 to bore 11 where it passes through groove 26 in spool 12 and into fluid outlet 14 where it is discharged to the next adjacent following valve.

Figure 3:
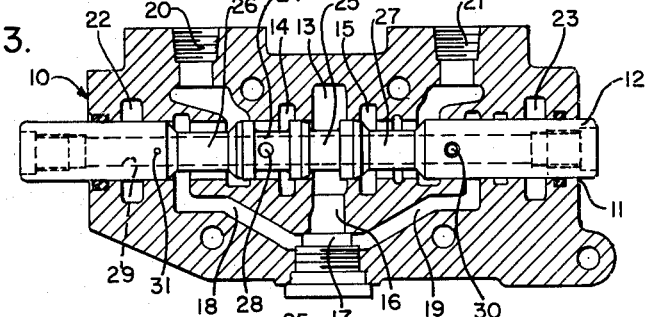
FIGURE 3 is a section identical with that of FIGURE 1 with the valve element in a second power position as, for example, to lower a highlift bucket.

FIGURE 3 illustrates the valve of this invention in the lower position with fluid entering fluid inlet 13 and passing through passage 16 to arm 18 through check valve 17. From arm 18 the fluid enters bore 11 through groove 26 and passes to the high pressure outlet or port 20 feeding one side of the work cylinder. Return fluid from the work cylinder enters high pressure outlet or port 21 and passes through bore 11 along groove 27 to fluid outlet 15 from which it leaves the valve body to the next adjacent valve.

Figure 4:
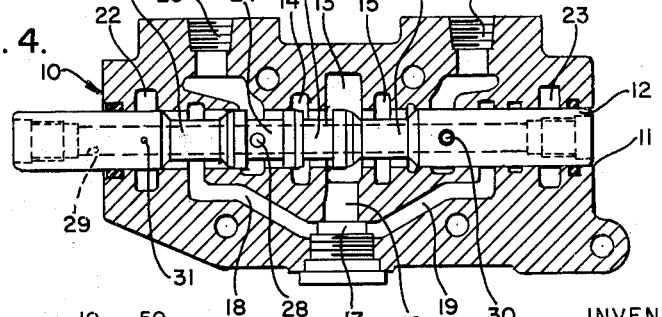
FIGURE 4 is a section identical with that of FIGURE 1 with the valve element in float position to interconnect both sides of a double acting power cylinder.
Figure 5:
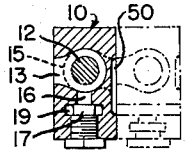
FIGURE 5 is a section on the line V—V of FIGURE 1 showing the fluid outlet port adapted to connection with a downstream parallel valve.

FIGURE 4 illustrates the float position in which fluid entering inlet 13 passes to fluid outlets 14 and 15 and on to the next following valve inlet. At the same time passage 16 and arms 17 and 18 are maintained pressurized. High pressure outlets or ports 20 and 21 are connected together by means of the openings 28 in the bottom of groove 24, the axial passage 28 and an opening 30 in the valve element adjacent groove 27. A bleeder opening 31 of restricted size connects axial passage 29 with exhaust outlet 22. The bleeder opening 31 is necessary to provide an exhaust for the excess liquid moving from the lift side of the working cylinder to the lower side of the same cylinder which normally carries the working piston arm which engages the work bucket.

It will be seen from this structure that the return fluid entering the valve is never exhausted to the exhaust ports but always to the fluid output to feed the next adjacent valve, thereby providing a source of fluid permitting operation of the next valve simultaneously with the valve of this invention. This is true in all positions including both work positions and the float position.

In the foregoing specification and in the accompanying drawings, I have illustrated a present preferred embodiment of my invention. It will be understood, however, that this invention may be otherwise embodied within the scope of the following claims.

I claim:

1. In a control valve, a housing having a bore extending therethrough and open at each end to receive an elongated spool valve element, a fluid inlet in said housing extending transverse to said bore and intersecting the bore intermediate its ends, a fluid outlet in said housing having portions transverse to and intersecting the bore on each side of the fluid inlet, each extending transversely of said bore and intersecting the bore at a point adjacent to but spaced from the intersection of the inlet passage, a valve element slidable in said bore, said valve element being hollow along its axis from a point adjacent one end to a point adjacent the opposite end providing end to end communication therethrough, a pair of high pressure ports intersecting the bore one on either side of the said fluid inlet and outlets, a pair of exhaust outlets in the housing intersecting the bore on either side of the fluid inlet and outlets and high pressure ports and passage means communicating between the fluid inlet and the bore adjacent each of the high pressure ports, said valve element having a neutral position in which fluid passes directly through the fluid inlet and the bore into the fluid outlets, a power position for each high pressure port which directs fluid from the fluid inlet through the said passage means to one high pressure port while directing fluid from the other high pressure port to an adjacent fluid outlet and a float position in which the two high pressure ports are connected through the hollow axis of the valve element and the fluid inlet is connected through the bore with the fluid outlet.

2. A control valve as claimed in claim 1 wherein the valve element is provided with bleeder means communicating between the hollow interior and an exhaust outlet when the valve element is in float position.

3. In a control valve, a housing having a bore extending therethrough and open at each end to receive an elongated spool valve element, a fluid inlet in said housing extending transverse to said bore and intersecting the bore intermediate its ends, a fluid outlet in said housing having portions transverse to and intersecting the bore on each side of the fluid inlet, each portion extending transversely of said bore and intersecting the bore at a point adjacent to but spaced from the intersection of the inlet passage, a valve element slidable in said bore, said valve element being hollow along its axis from a point adjacent one end to a point adjacent the opposite end providing end to end communication therethrough, a pair of high pressure ports intersecting the bore one on either side of the said fluid inlet and outlets, a pair of exhaust outlets in the housing intersecting the bore on either side of the fluid inlet and outlets and high pressure ports and passage means communicating between the fluid inlet and the bore adjacent each of the high pressure ports, said valve element having spaced grooves arranged so that with the valve element in a neutral position fluid passes directly through the fluid inlet through two adjacent grooves and the bore into the fluid outlets, when the valve is shifted in either direction from neutral a power position for each high pressure port in which fluid from the fluid inlet passes through the said passage means to one high pressure port through a groove in the valve element and the bore while directing fluid from the other high pressure port through a spaced groove and the bore to an adjacent fluid outlet and when the valve element is shifted beyond the power position in one direction a float position in which the two high pressure ports are connected through the hollow axis of the valve element and the fluid inlet is connected through the bore with the fluid outlet, said valve element having a bleeder means communicating between an exhaust outlet and said hollow axis and high pressure ports permitting excess fluid in the system to be exhausted during the float position.

4. A control valve as claimed in claim 3 wherein check valve means is provided in the passage means to limit return of fluid therethrough to the fluid inlet.

5. A control valve as claimed in claim 3 wherein the bleeder means is an opening having a diameter smaller than the diameter of the hollow axis of the valve element to provide a restricted flow therethrough.

References Cited by the Examiner

UNITED STATES PATENTS

| | | | |
|---|---|---|---|
| 2,949,097 | 8/60 | Vander Kaay | 137—596.12 X |
| 3,000,397 | 9/61 | Schmiel | 137—596.13 |
| 3,120,858 | 2/64 | Markovich | 137—625.69 |

M. CARY NELSON, *Primary Examiner.*